United States Patent
Yen et al.

(10) Patent No.: US 7,017,816 B2
(45) Date of Patent: Mar. 28, 2006

(54) EXTRACTING GRAPHICAL BAR CODES FROM TEMPLATE-BASED DOCUMENTS

(75) Inventors: Jonathan Yen, San Jose, CA (US); Jian Fan, Cupertino, CA (US); Daniel Tretter, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 212 days.

(21) Appl. No.: 10/675,026

(22) Filed: Sep. 30, 2003

(65) Prior Publication Data

US 2005/0067496 A1 Mar. 31, 2005

(51) Int. Cl.
G02B 26/10 (2006.01)

(52) U.S. Cl. .......................... 235/462.25; 235/462.08; 382/209

(58) Field of Classification Search .......... 235/462.25, 235/462.01, 462.08, 375, 435, 487; 382/190, 382/199, 209, 183; 283/17, 901, 72, 93
See application file for complete search history.

(56) References Cited

U.S. PATENT DOCUMENTS

| | | | | |
|---|---|---|---|---|
| 4,948,955 A | * | 8/1990 | Lee et al. | 235/462.08 |
| 4,988,852 A | * | 1/1991 | Krishnan | 235/462.08 |
| 5,120,940 A | * | 6/1992 | Willsie | 235/462.08 |
| 5,303,313 A | * | 4/1994 | Mark et al. | 382/235 |
| 5,304,787 A | * | 4/1994 | Wang | 235/462.09 |
| 6,082,619 A | * | 7/2000 | Ma et al. | 235/462.1 |
| 6,366,696 B1 | * | 4/2002 | Hertz et al. | 382/183 |
| 6,546,136 B1 | * | 4/2003 | Hull | 382/209 |
| 6,565,003 B1 | * | 5/2003 | Ma | 235/462.1 |
| 6,655,592 B1 | * | 12/2003 | Shaked et al. | 235/462.01 |
| 6,708,884 B1 | * | 3/2004 | Su et al. | 235/462.09 |
| 6,721,463 B1 | * | 4/2004 | Naoi et al. | 382/305 |
| 6,722,567 B1 | * | 4/2004 | Shaked et al. | 235/462.01 |
| 6,742,708 B1 | * | 6/2004 | Shaked et al. | 235/462.01 |
| 6,775,775 B1 | * | 8/2004 | Yoshiura et al. | 713/186 |
| 6,863,218 B1 | * | 3/2005 | Muramatsu | 235/462.25 |
| 6,895,116 B1 | * | 5/2005 | Yen et al. | 382/199 |
| 2002/0044688 A1 | * | 4/2002 | Naoi et al. | 382/190 |
| 2002/0074405 A1 | * | 6/2002 | Hadano et al. | 235/462.08 |
| 2002/0186884 A1 | * | 12/2002 | Shaked et al. | 382/183 |
| 2002/0196979 A1 | * | 12/2002 | Yen et al. | 382/190 |
| 2003/0031366 A1 | * | 2/2003 | Li et al. | 382/206 |
| 2003/0035147 A1 | * | 2/2003 | Patton et al. | 358/3.28 |
| 2003/0047612 A1 | * | 3/2003 | Shaked et al. | 235/462.1 |
| 2003/0066890 A1 | * | 4/2003 | Shaked et al. | 235/462.01 |
| 2003/0112471 A1 | * | 6/2003 | Damera-Venkata et al. | 358/3.28 |
| 2004/0020989 A1 | * | 2/2004 | Muramatsu | 235/462.1 |
| 2004/0062443 A1 | * | 4/2004 | Yen et al. | 382/209 |
| 2004/0074967 A1 | * | 4/2004 | Takakura et al. | 235/462.08 |
| 2004/0099741 A1 | * | 5/2004 | Dorai et al. | 235/462.08 |
| 2005/0094844 A1 | * | 5/2005 | Damera-Venkata | 382/100 |

FOREIGN PATENT DOCUMENTS

WO WO02/39720 5/2002

* cited by examiner

*Primary Examiner*—Karl D. Frech
*Assistant Examiner*—Daniel Walsh (57) ABSTRACT

Systems and methods of extracting from an input image a graphical bar code containing graphically encoded information are described. In one aspect, a document template is matched to the input image. The document template is selected from a set of document templates each having a respective predetermined page layout corresponding to a respective document type and including a predetermined graphical bar code location. The input image is cropped based on information relating to the graphical bar code location in the page layout of the document template matched to the input image to produce a cropped graphical bar code candidate for decoding.

31 Claims, 6 Drawing Sheets

Indian Institute of Management Bangalore on the recommendation of the Faculty
hereby confers the Post Graduate Diploma in Software Enterprise Management on

Nithin Jain who has successfully completed the prescribed course of studies and
fulfilled all other requirements Given under the seal of the Indian Institute of Management Bangalore
at the Convocation held on
the First Day of July, Two Thousand and Two.

| Chairperson, | | Chairman, |
| Post Graduate program in | Director | IIMB Society |
| Software Enterprise Management | | |

EXTRACTING GRAPHICAL BAR CODES FROM TEMPLATE-BASED DOCUMENTS

CROSS-REFERENCE TO RELATED APPLICATIONS

This application relates to the following co-pending applications, each of which is incorporated herein by reference: U.S. patent application Ser. No. 10/262,434, filed Oct. 1, 2002, by Jonathan Yen et al., and entitled "Extracting a Graphical Bar Code from an Input Image;" U.S. patent application Ser. No. 09/579,070, filed May 25, 2000, by Doron Shaked et al., and entitled "A Method and Apparatus for Generating and Decoding a Visually Significant Bar Code;" U.S. patent application Ser. No. 09/429,515, filed Oct. 28, 1999 by Renato Keshet et al., and entitled "System and Method for Counterfeit Protection;" U.S. Ser. No. 09/728,292, filed Dec. 1, 2000, by Jonathan Yen et al., and entitled "Authenticable Graphical Bar Codes;" U.S. Ser. No. 09/877,516, filed on Jun. 7, 2001, by Doron Shaked et al., and entitled "Generating and Decoding Graphical Bar Codes;" and U.S. patent application Ser. No. 09/877,581, filed on Jun. 7, 2001, and entitled "Automatically Extracting Graphical Bar Codes."

TECHNICAL FIELD

This invention relates to systems and methods of extracting graphical bar codes from template-based documents.

BACKGROUND

A typical bar code symbol is a pattern of parallel bars and spaces of various widths that represent data elements or characters. The bars represent strings of binary ones and the spaces represent strings of binary zeros. A conventional "one-dimensional" bar code symbol contains a series of bars and spaces that vary only in a single dimension. One-dimensional bar code symbols have relatively small information storage capacities. "Two-dimensional" bar codes have been developed to meet the increasing need for machine-readable symbols that contain more information than one-dimensional bar code symbols. The information storage capacity of two-dimensional bar code symbols is increased relative to one-dimensional bar codes by varying the bar code patterns in two dimensions. Common two-dimensional bar code standards include PDF417, Code 1, and Maxicode. One-dimensional and two-dimensional bar code symbols typically are read by optical scanning techniques (e.g., by mechanically scanned laser beams or by self-scanning charge-coupled devices (CCD's)) that convert a printed bar code symbol into electrical signals. The electrical signals are digitized and decoded to recover the data encoded in the printed bar code symbol.

Bar codes may be used in a variety of applications, including low information content applications (e.g., automatic price tagging and inventory management), and relatively high information content applications (e.g., encoding mail addresses and postage for automated mail reading and mail distribution systems, and encoding compressed content of a printed page).

SUMMARY

The invention features systems and methods of extracting from an input image a graphical bar code containing graphically encoded information.

In one aspect of the invention, a document template is matched to the input image. The document template is selected from a set of document templates each having a respective predetermined page layout corresponding to a respective document type and including a predetermined graphical bar code location. The input image is cropped based on information relating to the graphical bar code location in the page layout of the document template matched to the input image to produce a cropped graphical bar code candidate for decoding.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

A graphical bar code is an image that contains inconspicuous graphical modulations that encoded embedded information. The embodiments described in detail below provide an automated approach for quickly and efficiently extracting graphical bar codes from template-based documents. These embodiments leverage the substantially constant page layout characteristics of template-based documents to identify the type of template on which a document is based and to determine the relative orientation of the template-based documents so that the locations of graphical bar codes in the template-based documents may be readily determined. Based on this information, these embodiments automatically crop images of template-based documents to produce cropped graphical bar code candidates for decoding.

I. Template-based Documents

A template-based document is a document that has a predetermined (or preset) page layout that is defined by a template. The template may specify, for example, certain standardized features of a document, including document margins, the format and locations of standardized form content, and the format and locations of customized form content. A template-based document processed by the systems and in accordance with the methods described in detail below also includes at least one graphical bar code in a predetermined location specified by the template on which the document is based.

In general, a template-based document may correspond to any type of document having a predetermined page layout and, possibly, other standardized style and content features that are specified by a corresponding template. Exemplary document templates include templates for certificates containing certified statements, including land certificates and certificates of completion, such as course and degree certificates, and other standardized document templates.

Figure 1A:
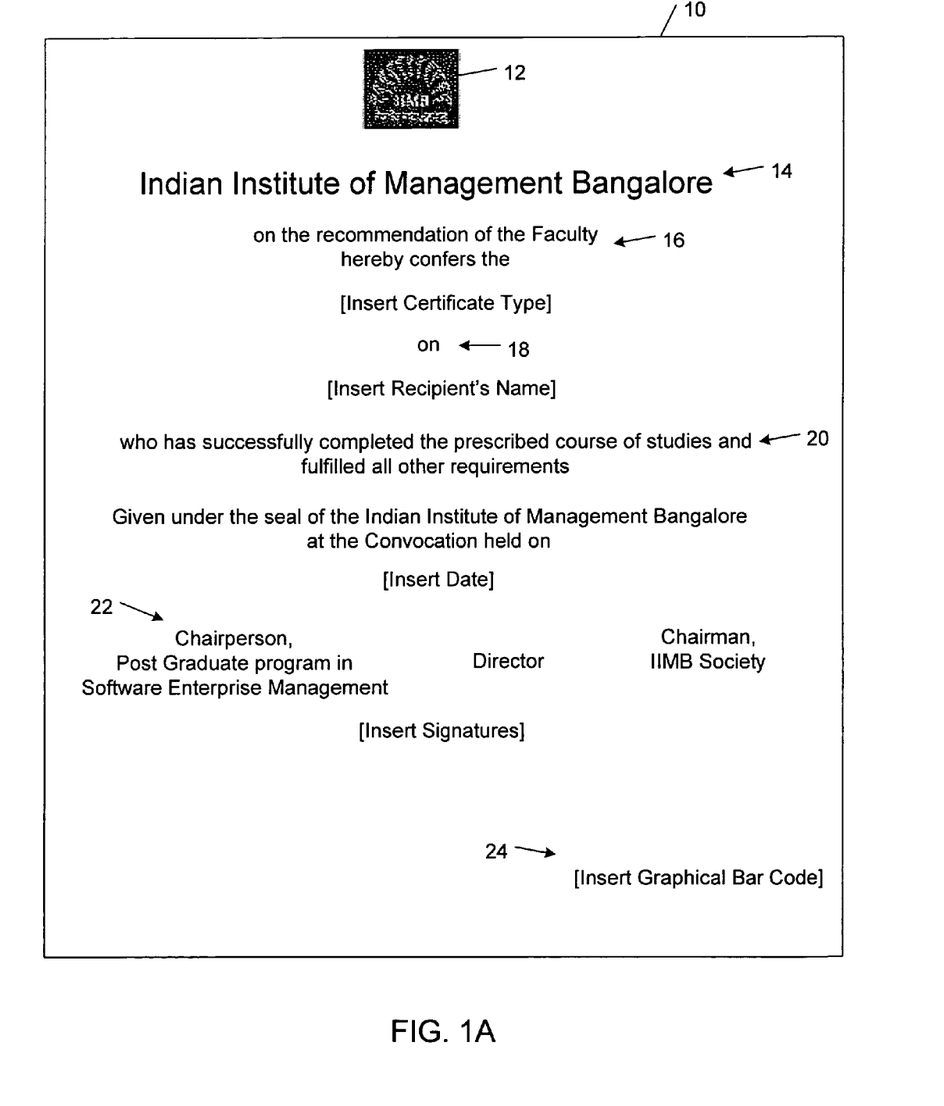
FIG. 1A shows a document template for an exemplary degree certificate document with multiple predetermined page layout locations for receiving customized content, including a location for receiving a graphical bar code.

Referring to FIG. 1A, in one example, a degree certificate type of document template 10 includes various standardized content, including a logo 12, the name 14 of the issuing institution, and standardized prefatory content 16, 18, 20, 22 located above respective locations where customized content, including certificate type, recipient's name, date, and authorized signatures, should be inserted. The degree certificate template 10 also specifies a location 24 where a customized graphical bar code should be inserted.

Figure 1B:
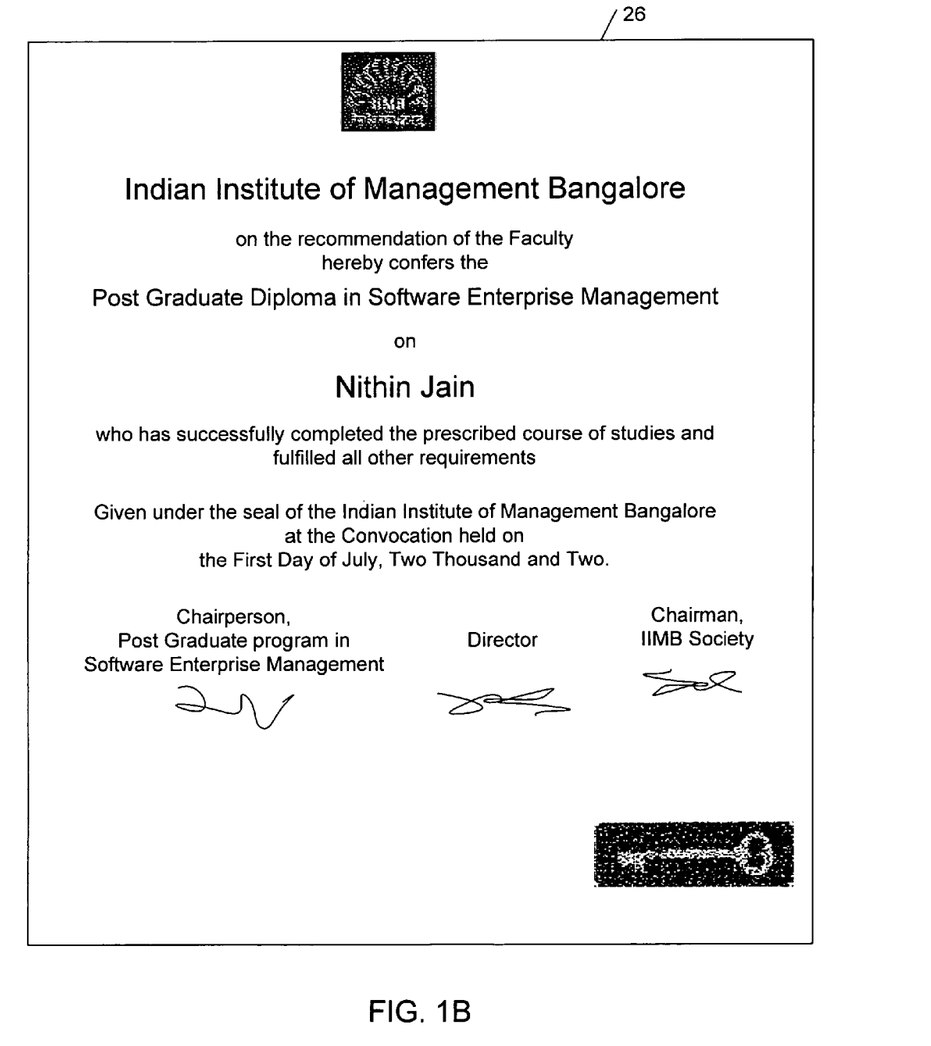
FIG. 1B shows a degree certificate document created based on the template of FIG. 1A.

FIG. 1B shows a degree certificate document 26 generated by inserting customized content into the degree certificate template 10 of FIG. 1A in the specified customized content page layout locations.

II. Exemplary Graphical Bar Codes for Template-based Documents

Figure 2:
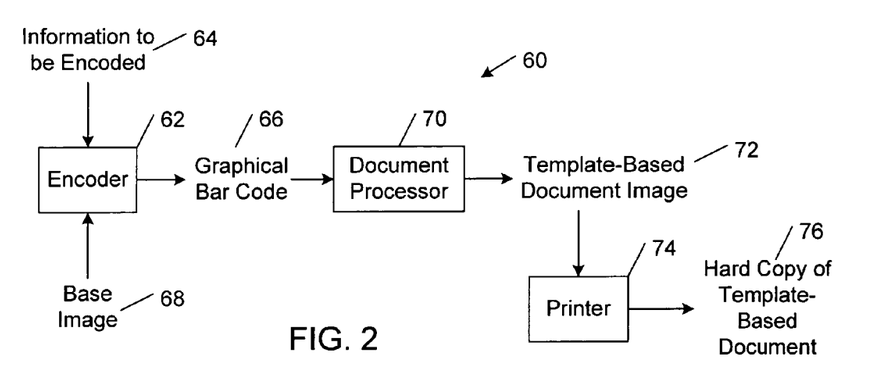
FIG. 2 is a block diagram of a system for incorporating a graphical bar code into a template-based document and for printing a hard copy of the template-based document.

Referring to FIG. 2, in one embodiment, a system 60 for incorporating a graphical bar code into a template-based document includes an encoder 62 that is configured to encode information 64 into a graphical bar code 66. Encoder 62 may be implemented as one or more program modules that are executable on a computer or other programmable processor. As explained in detail below, encoder 62 modulates a base image 68 with a graphical encoding of information 64 to produce graphical bar code 66. Base image 68 may be any graphical pattern, including a logo (e.g., a company logo), graphics, pictures, text, images, or any pattern that has visual significance. Information 64 may be embedded in the graphical design of text, pictures, images, borders, or the background of base image 68 to produce graphical bar code 16. Information 64 may be embedded in graphical bar code 66 in the form of a binary image (e.g., a black and white dot pattern), a multilevel image (e.g., a gray-level image), or a multilevel color image. System 60 also includes a document processor 70 that is configured to incorporate graphical bar code 66 into a template-based document image 72. Document processor 70 may be a conventional word processing application program or other document processing application program.

System 60 may include a printer 74 for producing a hard copy 76 of template-based document image 72. Printer 74 may be a conventional printer (e.g., a LaserJet® printer available from Hewlett-Packard Company of Palo Alto, Calif., U.S.A.) or a special-purpose label printing device. Hard copy 76 may be in the form of any one of a wide variety of printed materials, including a bank draft (or check) carrying a graphical bar code of a withdrawal authorization signature, a stock certificate or bond carrying a graphical bar code of an authenticity certification, and an envelope carrying a graphical bar code of postage indicia. In other embodiments, template-based document 76 may be rendered by other printing processes. For example, in some embodiments, graphical bar code 66 may be in the form of a tag that may be attached physically to a document to produce template-based document 76. Template-based document 76 also may be rendered in an electronic format (e.g., on a display screen).

In some embodiments, rather than embedding information 64 directly into base image 68, encoder 62 may be programmed to generate from information 64 a corroborative signed message, which then may be incorporated into graphical bar code 66. Such a corroborative signed message may be generated by the encoding process described in U.S. Ser. No. 09/728,292, filed Dec. 1, 2000, by Jonathan Yen et al., and entitled "Authenticable Graphical Bar Codes."

Figure 3A:
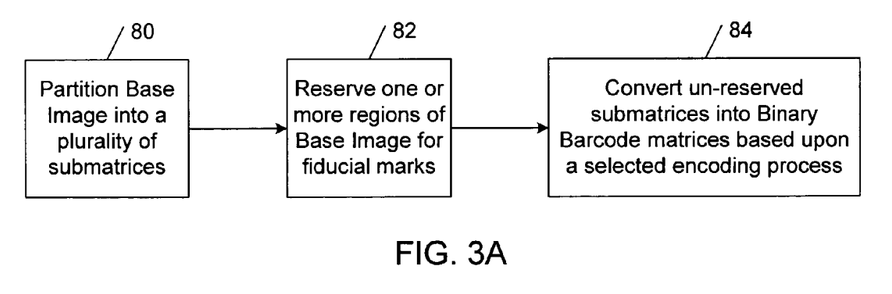
FIG. 3A is a flow diagram of a method of rendering a base image with a graphical encoding of information to generate a graphical bar code.
Figure 3B:
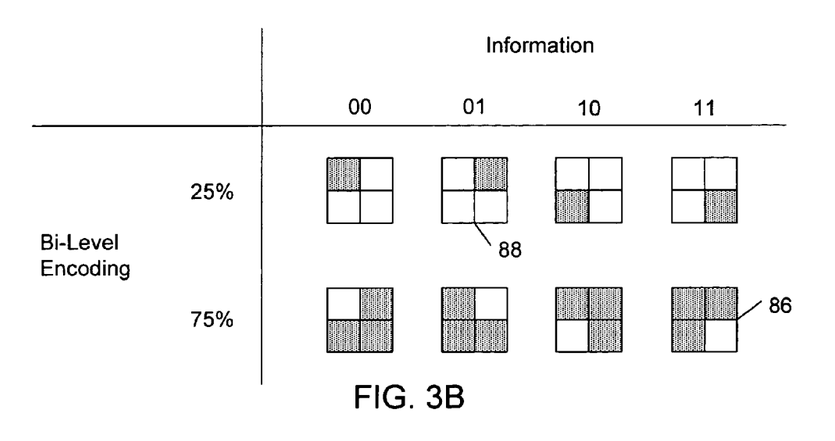
FIG. 3B is a table mapping information to a two-bit bi-level graphical code.

Referring to FIGS. 3A and 3B, graphical bar code 66 may be produced by graphically modulating base image 68 in accordance with the graphical encoding scheme described in co-pending U.S. patent application Ser. No. 09/579,070, filed May 25, 2000, by Doron Shaked et al., and entitled "A Method and Apparatus for Generating and Decoding a Visually Significant Bar code." In accordance with this graphical encoding process, base image 68 is partitioned into a plurality of sub-matrices (step 80). One or more regions of base image 68 are reserved for fiducial markings (step 82). Un-reserved sub-matrices are converted into binary bar code matrices based upon a selected graphical encoding process (step 84).

In one graphical encoding embodiment, information 64 may be encoded into a bi-level image by a two-bit encoding process based upon the two-by-two halftone patterns (or matrices) illustrated in FIG. 3B. In accordance with this graphical encoding process, sub-matrices in base image 68 undergo a thresholding process and a bi-level half-toning process. For example, in one embodiment, sub-matrices in base image 68 that have a gray level that is less than 50% are encoded with one of the four bar code matrices in the 25% row of FIG. 3B. Sub-matrices in base image 68 that have a gray level that is at least 50% are encoded with one of the four bar code matrices in the 75% row of FIG. 3B. In other embodiments, the encoding threshold level may be greater than or less than 50%. The particular bar code matrix used to render a sub-matrix of base image 68 is selected based upon the information to be encoded. For example, if "11" is to be encoded at a 75% gray level sub-matrix location, bar code matrix 86 is used to render that sub-matrix. Similarly, if "01" is to be encoded at a 25% gray level sub-matrix location, bar code matrix 88 is used to render that sub-matrix.

In general, the graphical encoding process of FIGS. 3A and 3B may be extended to M-bit encoding mappings, where M has an integer value of 1 or greater. For example, in one embodiment, information is encoded by a five-bit encoding process based upon three-by-three halftone patterns. In other embodiments, graphical bar code 66 may be produced by graphically modulating base image 68 in accordance with the graphical encoding scheme described in co-pending U.S. patent application Ser. No. 09/877,581, filed on Jun. 7, 2001, by Doron Shaked et al., and entitled "Generating and Decoding Graphical Bar Codes."

Figure 4:
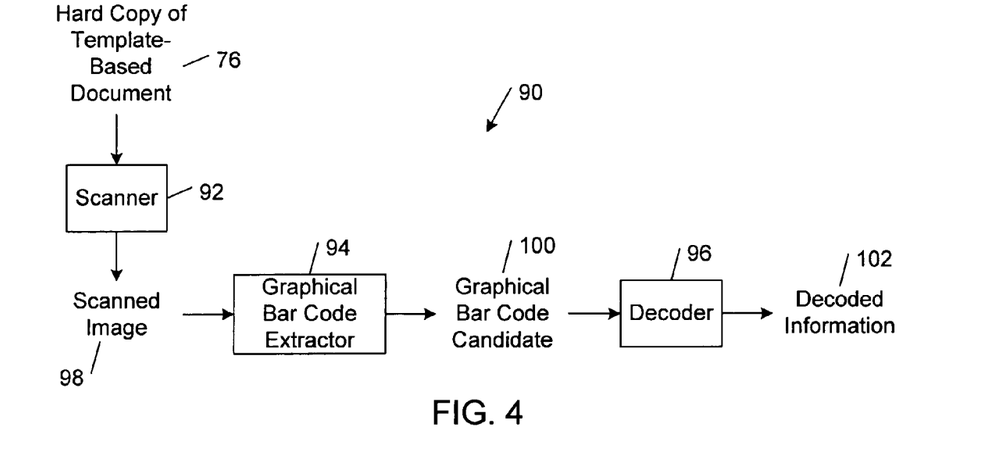
FIG. 4 is a block diagram of an embodiment of a system for automatically extracting a graphical bar code from a hard copy of a template-based document and decoding information from the extracted graphical bar code.

III. Automatically Extracting and Decoding Graphical Bar Codes in Template-based Documents A. System Overview As shown in FIG. 4, in one embodiment, a system 90 for automatically extracting information from a graphical bar code includes a scanner 92, a graphical bar code extractor 94, and a decoder 96. Scanner 92 may be a conventional desktop optical scanner (e.g., a ScanJet® scanner available from Hewlett-Packard Company of Palo Alto, Calif., U.S.A.), a portable scanner (e.g., a CapShare® portable scanner available from Hewlett-Packard Company of Palo Alto, Calif., U.S.A.), a conventional facsimile machine, or a camera (e.g., a digital camera). Graphical bar code extractor 94 and decoder 96 may be in the form of one or more program modules that are operable on a computer or other programmable processor. In operation, scanner 92 reads hard copy of template-based document 76 to produce a digitized scanned image 98. Graphical bar code extractor 94 determines the orientation and type of document template on which document 76 is based and the location of at least one graphical bar code candidate 100 that is incorporated within scanned image 98. Graphical bar code extractor 94 also extracts the graphical bar code candidate 100 from template-based document 72. In some embodiments, decoder 96 extracts information from the graphical bar code candidate 100 based upon a comparison of graphical bar code candidate 100 and base image 68. In embodiments in which information 64 is encoded into a corroborative signed message, decoder 96 may be configured to decode the signed message to produce a decoded message 102. The resulting signed message then may be decoded using a conventional error correction code decoding process.

The way in which information is encoded in the graphical bar code implementations described in section II makes the decoding process particularly sensitive to noise, such as extraneous markings and image corruption. Thus, in these implementations, in order to extract information from a graphical bar code, the graphical bar code should be isolated from the corresponding template-based document in a way that preserves the information-containing graphical modulations encoding the information by avoiding corruption of the graphical bar code, for example, by allowing sufficient space surrounding the graphical bar code. In addition, the extracted graphical bar code may be processed into a format that is suitable for decoding. For example, in some embodiments, the graphical bar code must be trimmed and resolution-scaled before it may be processed by decoder 96.

B. Training the Graphical Bar Code Extractor

Figure 5:
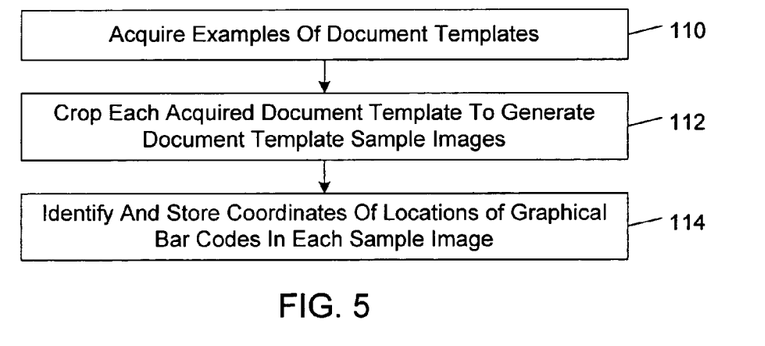
FIG. 5 is a flow diagram of an embodiment of a method of generating a set of document template sample images for use in matching an input image to a document template.

Referring to FIG. 5, in some embodiments, the graphical bar code extractor 94 is trained to identify the type of document template on which document 76 is based and the orientation of document 76 relative to the identified document template as follows.

At least one example of each type of document template to be recognized by the graphical bar code extractor is acquired (step 110). The document template examples may correspond to document templates that include exemplary customized content or they may not contain any customized content. The document template examples may be acquired, for example, by scanning hard copies of the document template examples with a scanner or a facsimile machine, or they may be obtained in some other way. For example, a document template example may be created directly from an original electronic source (e.g., a desktop publishing computer application program) without scanning a hard copy of the document template example.

In some implementations, each of the acquired document templates is cropped to exclude, for example, any aesthetic frame areas to generate a respective document template sample image (step 112).

The location of at least one graphical bar code in each of the document template sample images is identified and stored (step 114). The graphical bar code locations may be identified in accordance with any graphical bar code detection process. For example, the graphical bar code locations may be identified in accordance with the graphical bar code extraction process described in U.S. patent application Ser. No. 10/262,434, filed Oct. 1, 2002, by Jonathan Yen et al., and entitled "Extracting a Graphical Bar Code from an Input Image." In some embodiments, the graphical bar code locations may be identified from a lookup table that is derived from knowledge of the predetermined page layout locations of the graphical bar codes in the document templates to be recognized. The graphical bar code locations may be stored in the form of coordinate offsets of regions to be extracted by graphical bar code extractor 94. For example, in some implementations, the coordinates of the upper left corner and lower right corner of rectangular regions to be extracted are stored.

In some embodiments, each of the document template sample images is sub-sampled and binarized as described in detail below in connection with the method shown in FIG. 7. Each of these binarized thumbnails of the sample images may be stored in memory of graphical bar code extractor 94. In addition, for each sample image, multiple representative binarized thumbnails corresponding to different orientations of the corresponding document template may be generated and stored in memory. The stored binarized thumbnails of the sampled images may be used to compute the similarity measures in step 124 of the method shown in FIG. 7.

C. Extracting Graphical Bar Codes from Template-based Documents

Figure 6:
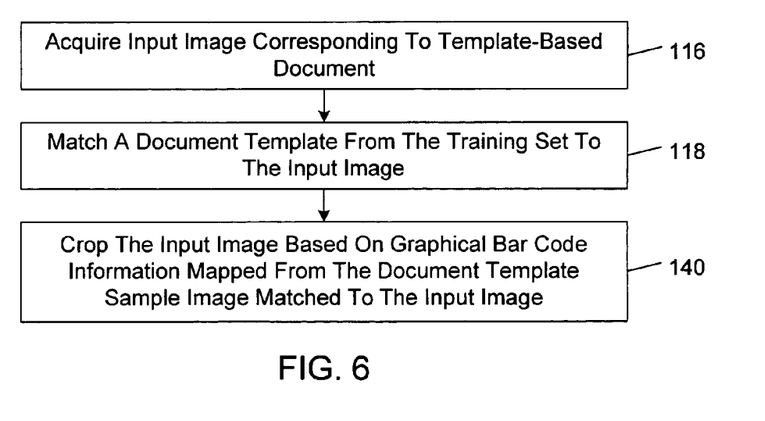
FIG. 6 is a flow diagram of an embodiment of a method of extracting a graphical bar code from a template-based document.
Figure 7:
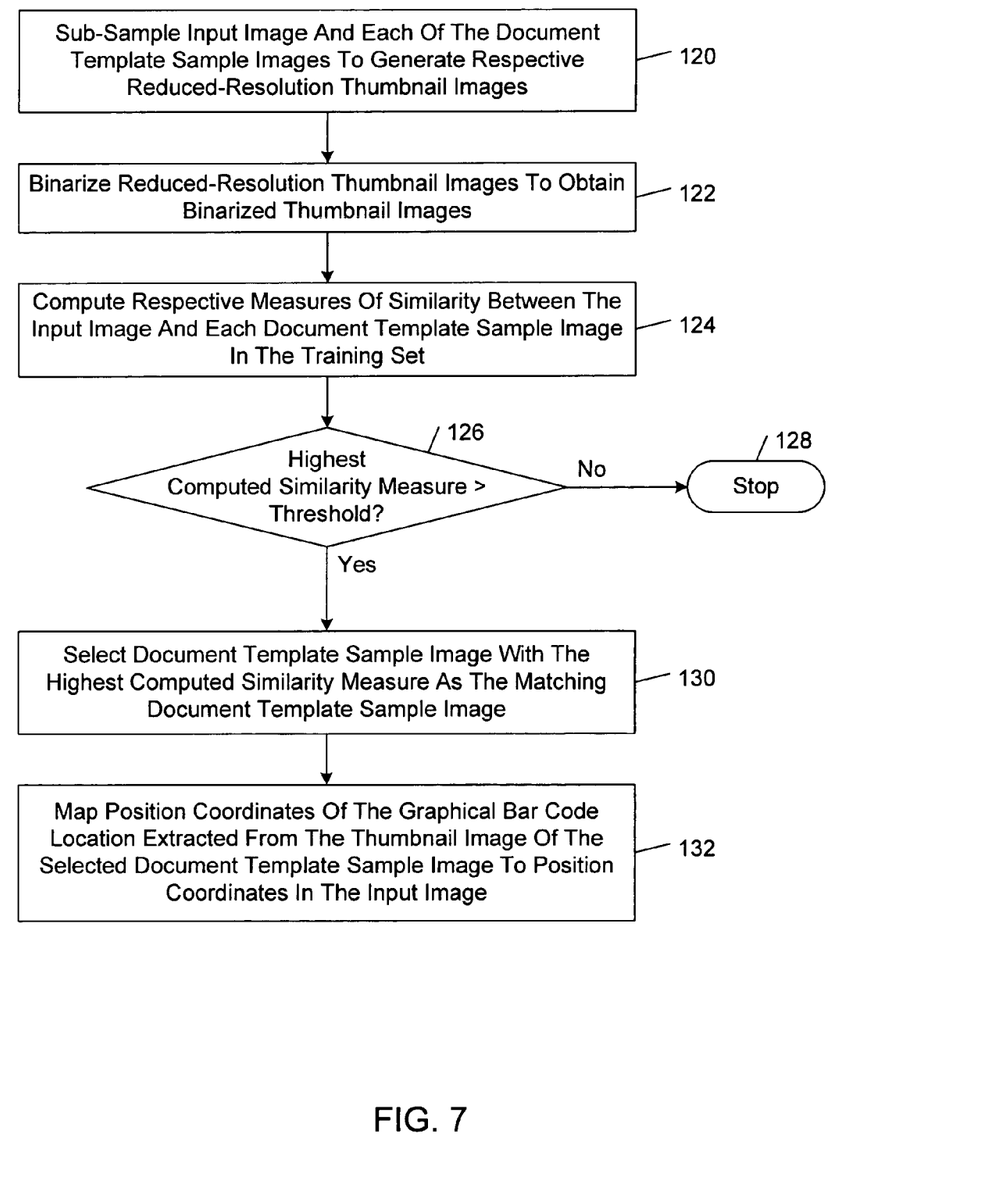
FIG. 7 is a flow diagram of an embodiment of a method of matching a document template to an input image.
Figure 8A:
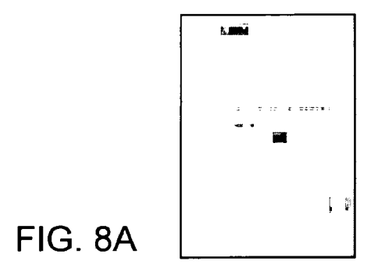
FIG. 8A shows an exemplary reduced-resolution thumbnail of an input image.
Figure 8B:
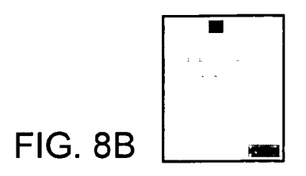
FIG. 8B shows an exemplary reduced-resolution thumbnail of a document template sample image.
Figure 9A:
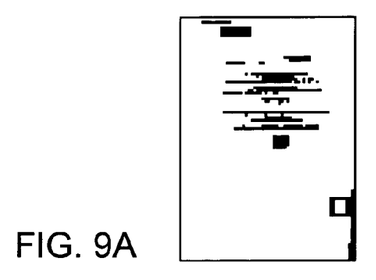
FIG. 9A shows a binarized version of the exemplary reduced-resolution thumbnail image of FIG. 8A.
Figure 9B:
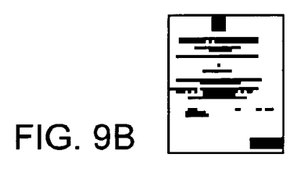
FIG. 9B shows a binarized version of the exemplary reduced-resolution thumbnail image of FIG. 8B.

Referring to FIGS. 6, 7, and 8, and initially to FIG. 6, graphical bar code extractor 94 is operable to identify the orientation and type of document template on which document 76 is based as follows.

An input image corresponding to hard copy of template-based document 76 is acquired (step 116). The input image may be acquired, for example, from scanner 92 in the embodiment of FIG. 4 or from some other source. Next, a document template sample image from the training set of document template sample images is matched to the input image (step 118).

Referring to FIGS. 7, 8A, and 8B, in some embodiments, a document template sample image is matched to the input image as follows. The input image and each of the acquired document template sample images is sub-sampled to generate respective reduced-resolution thumbnail images (step 120). FIG. 8A shows an example of a thumbnail of an input image and FIG. 8B shows an example of a thumbnail of a document template sample image. As shown in FIGS. 8A and 8B, in some circumstances, the sizes of the thumbnail images of the input image and the document template sample images may be substantially different. In the example illustrated in FIG. 8A, only a portion of the input image corresponds to the hard copy of the template-based document; the other areas of the input image correspond to areas of a flatbed scanner uncovered by the hard copy of the template-based document. In other circumstances, the sizes of these thumbnail images may be substantially the same.

The input image and the document template sample images may be sub-sampled using a common type of sub-sampling technique. In some embodiments, the input image and the document template sample images are sub-sampled at a high decimation rate to reduce the sensitivity of graphical bar code extractor 94 to noise and other artifacts that might be present in one or more of the input image or the document template sample images and to reduce the sensitivity of graphical bar code extractor 94 to variable field content. Decimation is a process of reducing a number of samples of an image, and the decimation rate is the rate at which the samples are reduced. In general, the decimation rate is determined empirically during the training process. In some implementations, the decimation rate is determined by a trade off among several design aspects. The larger the decimation rate, the faster graphical bar code extractor 94 is able to process the input image, but the less sensitive graphical bar code extractor 94 is to the noise and the variable content. In some situations, if the decimation rate is too large, there may not be enough details to distinguish one template from another. In some embodiments, the decimation rates for the input image and the document template sample images are selected so that the resulting thumbnail images have the same resolution. In this way, for example, the decimation rate will be twice as large for images scanned at twice the resolution. In one exemplary implementation, if the scanning resolution is 200 dpi, the decimation rate is 40.

The reduced-resolution thumbnails of the input image and each of the document template sample images are binarized to generate respective binarized thumbnail images (step 122). The reduced-resolution thumbnails of the input image and each of the document template sample images may be binarized in accordance with a common thresholding process. In some embodiments, the reduced-resolution thumbnail images are binarized using an image-dependent or adaptive thresholding process, such as a Kittler-Illingworth thresholding process (see, e.g., J. Kittler and J. Illingworth, "Minimum error thresholding," Pattern Recognition, Vol. 19, No. 1, pp. 41–47 (1986), which is incorporated herein by reference). In this way, these embodiments reduce the sensitivity of the graphical bar code extractor 94 to variations that might result from the use of different methods of acquiring the input and document template sample images. For example, in some embodiments, a Kittler-Illingworth thresholding process calculates a threshold value according to the histogram of the overall grayness of the image so that the binarization results are substantially independent of the grayness variation over the possible scanning devices that may be used to acquire the input image and the document template sample images.

As mentioned above, in some embodiments, the binarized thumbnail images representative of the document template sample images, including multiple different orientations of each document template sample image, may be pre-generated and stored in memory when the graphical bar code extractor 94 is being trained (see section III.B. above). In these embodiments, steps 120 and 122 are applied only to the input image.

Figure 10:
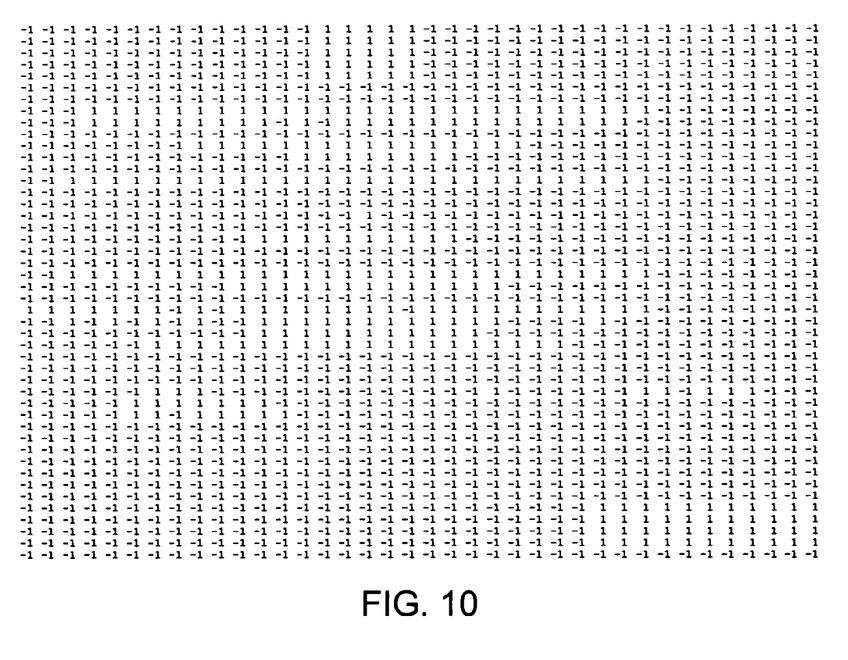
FIG. 10 is an array of values for a matched filter generated from a binarized thumbnail of a document template.

Respective measures of similarity between the input image and each of the document template sample images in the training set are computed (step 124). In some embodiments, the similarity measures are computed based on matched filters generated from the binarized thumbnail input image and each of the binarized thumbnail images of the document template samples. For example, in one implementation, the dark pixel locations in the binarized thumbnail images are mapped to values of "1" in the respective matched filters, and the light pixel locations in the binarized thumbnail images are mapped to values of "−1" in the respective matched filters. FIG. 10 shows an exemplary matched filter generated from a binarized thumbnail image of a document template sample image. The matched filter generated for the input image is convolved with the matched filters generated for each of the document template sample images to obtain respective maximum values corresponding to the similarity measures. In some embodiments, the matched filter generated for the input image is convolved with each of the matched filters generated for multiple orientations of each of the document template sample images (e.g., image orientations rotated 0°, 90°, 180°, and 270°).

The convolution that produces the highest similarity measure is compared to a threshold of matching similarity (e.g., 75%). If the highest computed similarity measure does not exceed the matching similarity threshold (step 126), it is concluded that the acquired input image does not match any of the stored document template samples and the process is terminated (step 128).

If the highest computed similarity measure exceeds the matching similarity threshold (step 126), the document template sample image and the document template sample image orientation corresponding to the highest computed similarity measure is selected as the matching document template sample image and the matching document template sample image orientation (step 130).

Position coordinates of the predetermined graphical bar code location in the thumbnail of the selected matching document template sample image are mapped to position coordinates in the input image (step 132).

Referring back to FIG. 6, the input image is cropped based on the graphical bar code location information mapped from the document template sample image matched to the input image (step 140).

Other embodiments are within the scope of the claims.

The systems and methods described herein are not limited to any particular hardware or software configuration, but rather they may be implemented in any computing or processing environment, including in digital electronic circuitry or in computer hardware, firmware, or software. In general, the systems may be implemented, in part, in a computer process product tangibly embodied in a machine-readable storage device for execution by a computer processor. In some embodiments, these systems preferably are implemented in a high level procedural or object oriented processing language; however, the algorithms may be implemented in assembly or machine language, if desired. In any case, the processing language may be a compiled or interpreted language. The methods described herein may be performed by a computer processor executing instructions organized, for example, into process modules to carry out these methods by operating on input data and generating output. Suitable processors include, for example, both general and special purpose microprocessors. Generally, a processor receives instructions and data from a read-only memory and/or a random access memory. Storage devices suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

What is claimed is:

1. A method of extracting from an input image a graphical bar code containing graphically encoded information, comprising:
matching to the input image a document template selected from a set of document templates each having a respective predetermined page layout corresponding to a respective document type and including a predetermined graphical bar code location; and
cropping the input image based on information relating to the graphical bar code location in the page layout of the document template matched to the input image to produce a cropped graphical bar code candidate for decoding.

2. The method of claim 1, wherein matching comprises sub-sampling the input image to generate a reduced-resolution thumbnail of the input image.

3. The method of claim 2, wherein matching comprises binarizing the thumbnail of the input image.

4. The method of claim 3, wherein the thumbnail of the input image is binarized in accordance with an image-dependent thresholding process.

5. The method of claim 4, wherein the target image is binarized in accordance with a Kittler-Illingworth image-dependent/adaptive thresholding process.

6. The method of claim 3, wherein matching comprises matching the binarized thumbnail of the input image to binary images representative of document templates.

7. The method of claim 6, wherein each document template in the set is represented by multiple binary images each representing a different orientation of the corresponding document template, and the binarized thumbnail of the input image is matched to each of the binary images representative of each of the document templates.

8. The method of claim 6, wherein matching comprises computing respective measures of similarity between the binarized thumbnail of the input image and the binary images representative of document templates.

9. The method of claim 8, wherein matching comprises identifying a candidate document template determined mostly likely to match the input image based on the computed similarity measures.

10. The method of claim 9, wherein the candidate document template is selected as the matching document template based on a comparison of a threshold to the computed measure of similarity between the binarized thumbnail of the input image and the binary image representative of the candidate document template.

11. The method of claim 8, wherein similarity measures are computed by convolving matched filters generated based on each of the binarized sub-sampled images representative of document templates with the binarized thumbnail of the input image.

12. The method of claim 6, wherein cropping the input image comprises mapping position coordinates of a graphical bar code location in an image corresponding to the binary image matched to the thumbnail of the input image to position coordinates in the input image.

13. The method of claim 1, wherein matching comprises identifying the document type and orientation of the selected document template.

14. The method of claim 1, wherein each document template in the set is represented by multiple corresponding representative images.

15. The method of claim 14, wherein each of the multiple images represents a different orientation of the corresponding document template.

16. The method of claim 1, wherein the graphical bar code corresponds to a base image modulated with a graphical encoding of information.

17. The method of claim 1, further comprising acquiring sample images representative of respective document templates in the set.

18. The method of claim 17, further comprising sub-sampling images representative document templates to generate a respective reduced-resolution thumbnail of the sample images.

19. The method of claim 18, further comprising binarizing the thumbnails of the sample images.

20. The method of claim 19, further comprising generating from each sample image multiple binarized thumbnails corresponding to different respective orientations of the corresponding document template.

21. A system for extracting from an input image a graphical bar code containing graphically encoded information, comprising:
a document template matching module operable to match to the input image a document template selected from a set of document templates each having a respective predetermined page layout corresponding to a respective document type and including a predetermined graphical bar code location; and
a cropping module operable to crop the input image based on information relating to the graphical bar code location in the page layout of the document template matched to the input image to produce a cropped graphical bar code candidate for decoding.

22. The system of claim 21, wherein the document template matching module is operable to sub-sample the input image to generate a reduced-resolution thumbnail of the input image.

23. The system of claim 22, wherein the document template matching module is operable to binarize the thumbnail of the input image.

24. The system of claim 23, wherein the thumbnail of the input image is binarized in accordance with an image-dependent thresholding process.

25. The system of claim 23, wherein the document template matching module is operable to match the binarized thumbnail of the input image to binary images representative of document templates.

26. The system of claim 25, wherein the document template matching module is operable to compute respective measures of similarity between the binarized thumbnail of the input image and the binary images representative of document templates.

27. The system of claim 26, wherein the document template matching module is operable to identify a candidate document template determined mostly likely to match the input image based on the computed similarity measures.

28. The system of claim 27, wherein the candidate document template is selected as the matching document template based on a comparison of a threshold to the computed measure of similarity between the binarized thumbnail of the input image and the binary image representative of the candidate document template.

29. The system of claim 26, wherein similarity measures are computed by convolving matched filters generated based on each of the binary images representative of document templates with the binarized thumbnail of the input image.

30. The system of claim 25, wherein the cropping module is operable to map position coordinates of a graphical bar code location in an image corresponding to the binary image matched to the thumbnail of the input image to position coordinates in the input image.

31. A computer program for extracting from an input image a graphical bar code containing graphically encoded information, the computer program residing on a computer-readable medium and comprising computer-readable instructions for causing a computer to:

match to the input image a document template selected from a set of document templates each having a respective predetermined page layout corresponding to a respective document type and including a predetermined graphical bar code location; and crop the input image based on information relating to the graphical bar code location in the page layout of the document template matched to the input image to produce a cropped graphical bar code candidate for decoding.

* * * * *